United States Patent [19]

Haga et al.

[11] Patent Number: 5,538,095
[45] Date of Patent: Jul. 23, 1996

[54] POWER STEERING APPARATUS

[75] Inventors: Kyosuke Haga, Anjo; Mikio Suzuki, Takahama; Katsuhisa Mori, Okazaki, all of Japan

[73] Assignee: Toyoda Koki Kabushiki Kaisha, Kariya, Japan

[21] Appl. No.: 489,837

[22] Filed: Jun. 13, 1995

[30] Foreign Application Priority Data

Jun. 14, 1994 [JP] Japan ..................... 6-131653

[51] Int. Cl.⁶ .................... B62D 5/12; B62D 6/02
[52] U.S. Cl. .................. 180/423; 180/441; 180/417
[58] Field of Search .................... 180/132, 141, 180/142, 143

[56] References Cited

U.S. PATENT DOCUMENTS 5,184,691  2/1993  Leutner .................... 180/132

FOREIGN PATENT DOCUMENTS 0594137  4/1994  European Pat. Off. .
0653342  5/1995  European Pat. Off. .

*Primary Examiner*—Kevin T. Hurley
*Attorney, Agent, or Firm*—Oblon, Spivak, McClelland, Maier & Neustadt

[57] ABSTRACT

A power steering apparatus comprises a fluid source for supplying pressurized fluid, a power cylinder having a pair of fluid chambers, a control valve, and a drain control mechanism. The control valve is composed of first and second control portions. The first control portion has four paths connecting the fluid source and the reservoir, and each of the four paths is formed with a variable orifice of center-open type. The second control portion has two supply paths communicating the fluid source with the fluid chambers of the power cylinder, each of the supply paths being formed with a variable orifice of center-open type, and two drain paths communicating the fluid chambers with the reservoir, each of the drain paths being formed with a variable orifice of center-closed type. The drain control mechanism is responsive to differential pressure between the fluid chambers of the power cylinder to control the communication of one fluid chamber under high pressure with the reservoir, and is responsive to a vehicle speed to control the communication of both fluid chambers with the reservoir.

6 Claims, 6 Drawing Sheets

POWER STEERING APPARATUS

BACKGROUND OF THE INVENTION

1. Field of the Invention

The present invention relates to a hydraulic power steering apparatus suitable for use in automobiles and the like.

2. Discussion of the Prior Art

Figure 1:
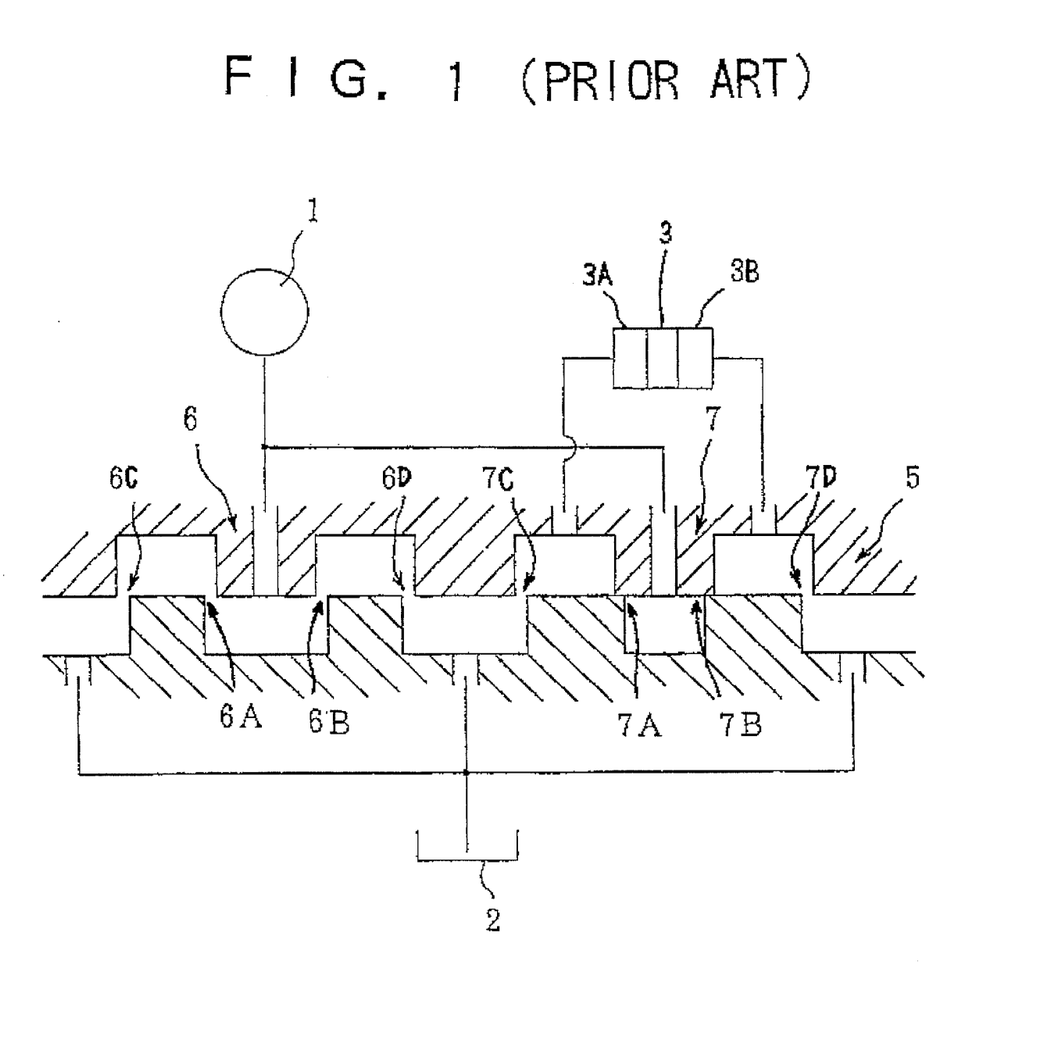
FIG. 1 is a diagram showing a power steering apparatus according to the prior art, with a rotary control valve enlarged partly.

There has been a power steering apparatus which is designed to increase the total rigidity of a steering wheel around the neutral position by preventing the increasing of the differential pressure across a power cylinder. Such power steering apparatus is composed of an engine-driven pump 1, a reservoir 2, a power cylinder 3 for assisting the steering operation, and a rotary control valve 5, as shown in FIG. 1. The rotary control valve 5 fluidly controls pressurized fluid which is supplied from the pump 1 to the power cylinder 3, upon rotation of the steering wheel (not shown). The control valve 5 is composed of a first control portion 6 having variable orifices 6A–6D of center-open type, and a second control portion 7 having variable orifices 7A and 7B of center-closed type communicating with the pump 1 and variable orifices 7C and 7D of center-open type communicating with the reservoir 2.

In the above-mentioned constitution, since the center-closed variable orifices 7A and 7B remains closed around the neutral position, the differential pressure between both fluid chambers 3A and 3B is maintained to be substantially zero. As the steering wheel is turned beyond a certain angle from the neutral direction, for example, in rightward, the center-closed variable orifice 7B communicating with the pump 1 begins to open, and the opening area of the variable orifice 7D communicating with the reservoir 2 is reduced, so that the differential pressure is generated between the both fluid chambers 3A and 3B to assist the steering operation.

In this manner, the differential pressure between the both fluid chambers 3A and 3B of the power cylinder 3 can be prevented from increasing around the neutral position, whereby the total rigidity of the steering wheel around the neutral position can be increased.

However, such power steering apparatus involve some drawbacks. When the steering wheel is returned to the neutral position, the rotary control valve 5 comes back to the neutral position. In such a state, flow passages leading to the both fluid chambers 3A and 3B are closed by the center-closed variable orifices 7A and 7B. Although the pressurized fluid is supplied from the pump 1 to the fluid chamber 3A low in the pressure through the center-open variable-orifices 6B, 6D and 7C, such supply is delayed due to the resistances of the variable orifices 6B, 6D and 7C, which causes the delay in the returning of the steering wheel to the neutral position.

Further, it is recognized that power assistance at a low vehicle speed may be desirably more than that at a high speed and is required even around the neutral position of the steering wheel. But the conventional control valve 5 has a fixed hydraulic characteristic. Namely, the differential pressure across the power cylinder 3 is changed in dependence upon the rotational angle of the steering wheel, and has no relation with the vehicle speed. As a result, the total rigidity of the steering wheel is maintained to be high around the neutral position and therefore, a suitable power assistance can not be obtained in accordance with the vehicle speed.

SUMMARY OF THE INVENTION

Accordingly, it is an object of the present invention to provide an improved power steering apparatus capable of providing a driver with an improved steering feeling around the neutral position of a steering wheel.

Another object of the present invention is to provide an improved power steering apparatus capable of obtaining a desired power assistance at any vehicle speed.

A further object of the present invention is to provide an improved power steering apparatus capable of improving the return of a steering wheel.

Briefly, the present invention provides a power steering apparatus comprising a fluid source for supplying pressurized fluid, a power cylinder having a pair of fluid chambers and operable to generate assisting power, a control valve, and a drain control mechanism. The control valve is composed of first and second control portions. The first control portion has at least one path connecting the fluid source and the reservoir, and each of the paths is formed with a variable orifice of center-open type, to control the flow of pressurized fluid from the fluid source to the reservoir. The second control portion has two supply paths communicating the fluid source respectively with the pair of fluid chambers of the power cylinder, each of the supply paths being formed with a variable orifice of center-open type, and two drain paths communicating the fluid chambers of said power cylinder respectively with the reservoir, each of the drain paths being formed with a variable orifice of center-closed type. The drain control mechanism is responsive to differential pressure between the fluid chambers of the power cylinder to control the communication of one fluid chamber under high pressure with the reservoir, and responsive to a vehicle speed to control the communication of both fluid chambers with said reservoir.

With this configuration, at a high vehicle speed, the differential pressure across the power cylinder is maintained to be substantially zero when the steering wheel is around the neutral position. At a low vehicle speed or stop of the vehicle, the differential pressure across the power cylinder is generated in accordance with the relative rotational angle of the control valve even when the steering wheel is around the neutral position. Therefore, the total rigidity of the steering wheel around the neutral position can be changed in accordance with the vehicle speed, and a desired power assistance can be obtained at any vehicle speed.

Further, when the steering wheel is returned to the neutral position, one of the fluid chambers of the power cylinder is in communication with the other thereof through the center-open variable orifices of the second control portion. This permits the fluid to flow between the fluid chambers, so that the returning of the steering wheel can be improved.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 2:
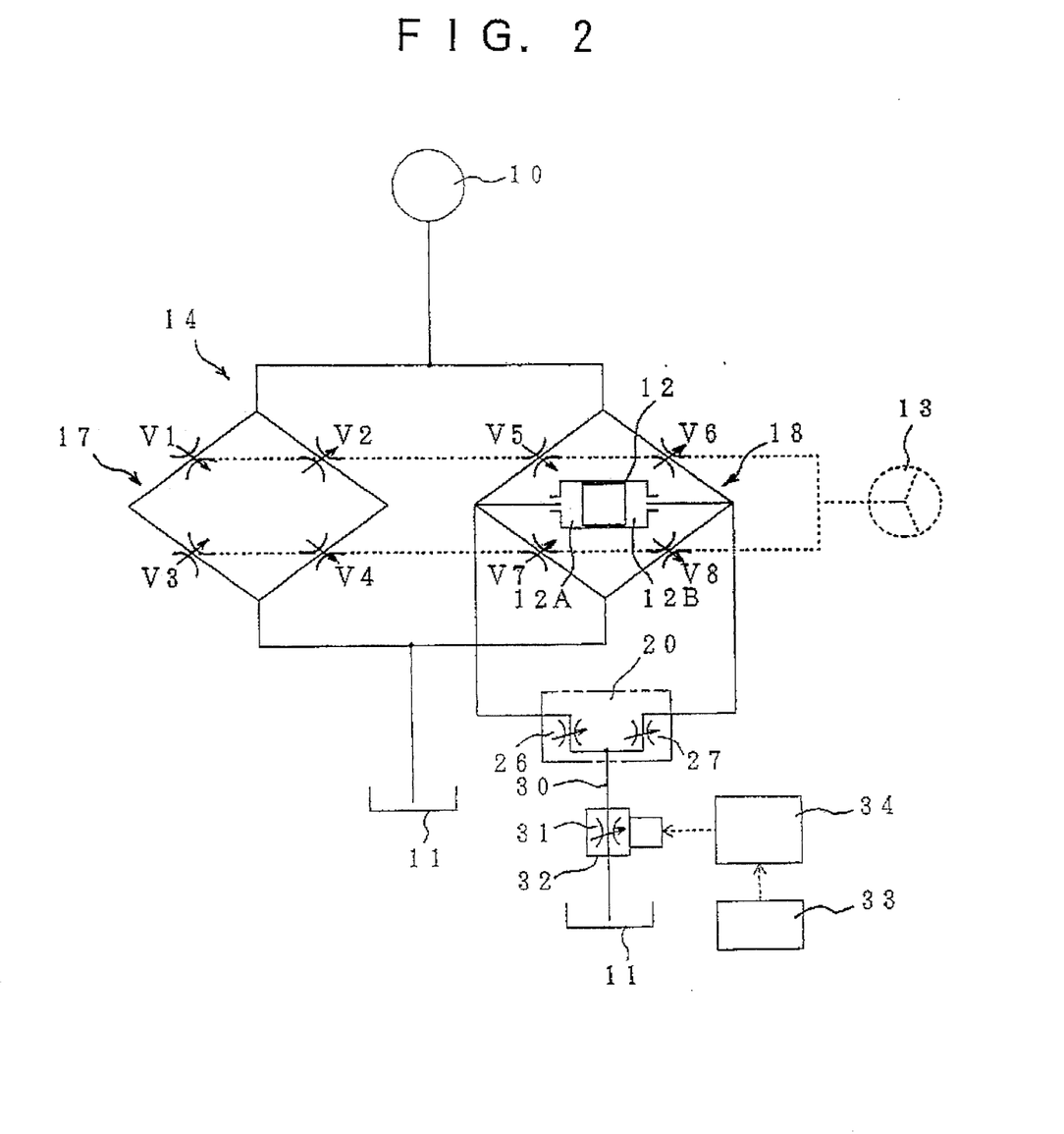
FIG. 2 is a diagram showing an entire construction of a power steering apparatus according to the present invention.

Referring now to FIG. 2, a hydraulic power steering apparatus according to the present invention is mainly composed of a pump 10 by which pressurized fluid is discharged at constant flow rate, a reservoir 11, a power cylinder 12 for assisting the steering operation, a rotary control valve 14. The rotary control valve 14 is responsive to rotation of a steering wheel 13 so as to control the flow of the pressurized fluid from the pump 10 to the power cylinder 12.

Figure 3:
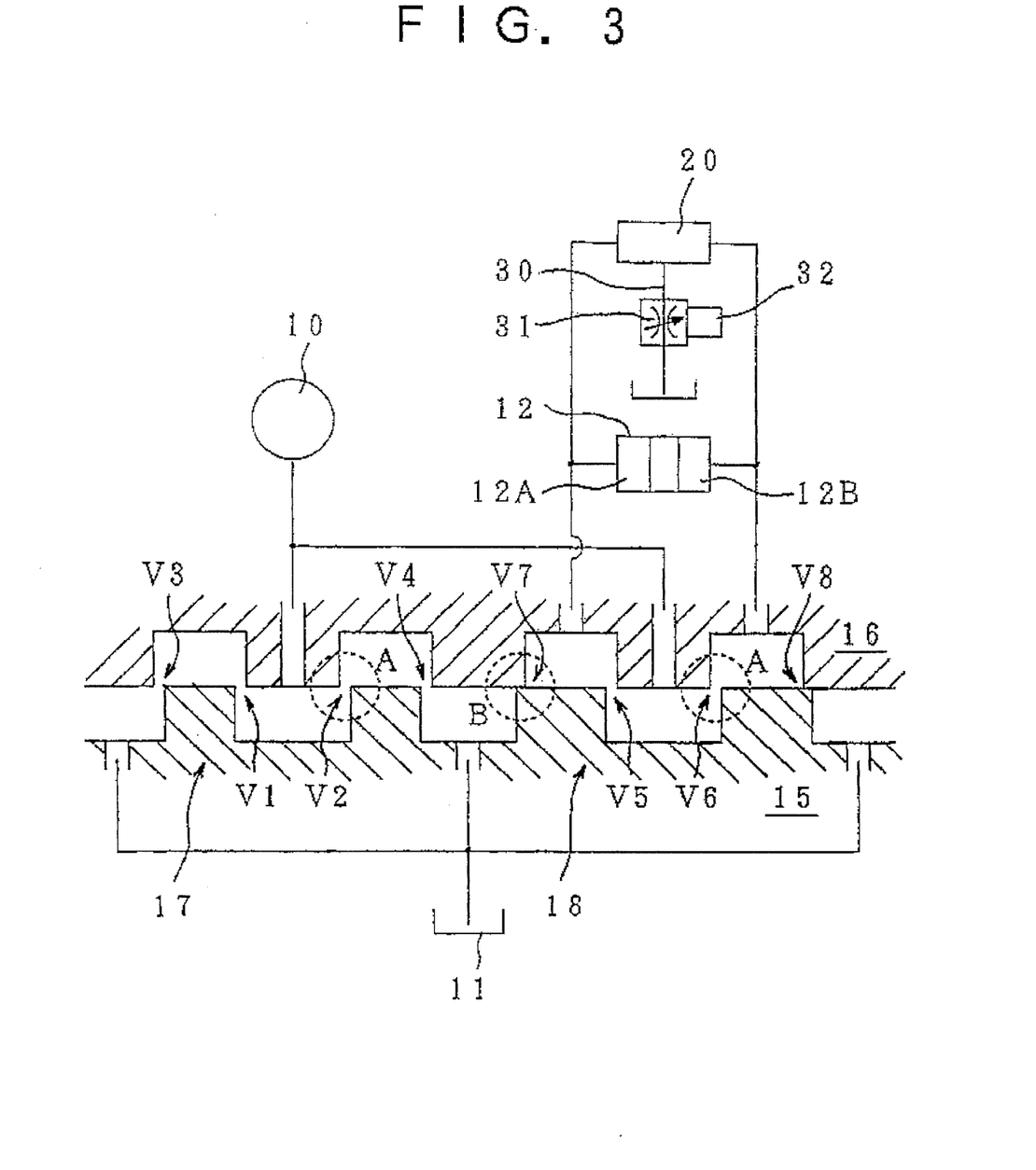
FIG. 3 is a diagram of a rotary control valve enlarged partly of the apparatus shown in FIG. 2, similar to FIG. 1.

The rotary control valve 1–4, shown as an enlarged development view in FIG. 3, is composed of a valve shaft 15 coupled to the steering wheel 13 for rotation therewith, a valve body 16 arranged to surround the valve shaft 15 in a coaxial relationship therewith, a torsion bar (not shown) connecting the valve shaft 15 with the valve body 16 in the manner that they are relatively rotatable, and a valve housing (not shown) receiving the above-mentioned components therein. The valve body 16 is mechanically connected to a steering linkage to which hydraulic force generated by the power cylinder 12 is applied.

The outer surface of the valve shaft 15 and the inner surface of the valve body 16 is provided with a plurality of axial slots, which are formed at predetermined intervals in the circumferential direction. Thus, two kinds of control portions, i.e., a first control portion 17 and a second control portion 18 are formed between the valve shaft 15 and the valve body 16 alternatively at intervals of 90 degrees in the circumferential direction so as to control the flow of pressurized fluid.

Figure 4:
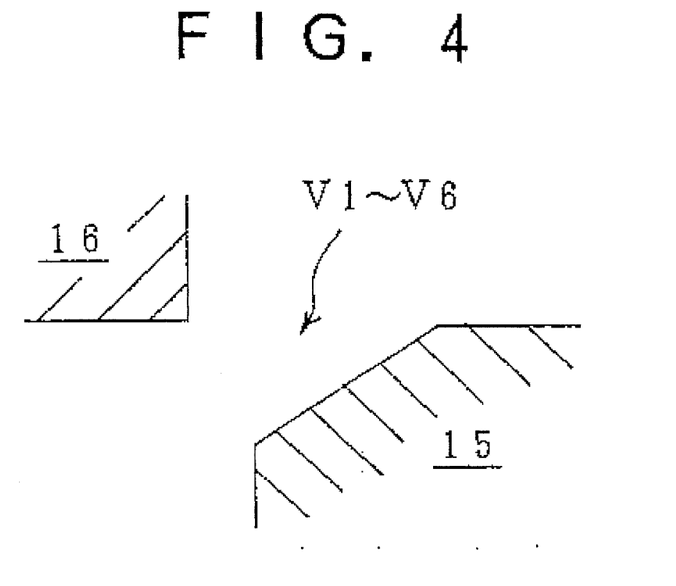
FIG. 4 is an enlarged view of the portion A in FIG. 3.

The first control portion 17 has four fluid paths which are connected to the pump 10 and the reservoir 11, and four variable orifices V1, V2, V3 and V4 are disposed on the of the fluid paths, respectively. Each of the variable orifices V1, V2, V3 and V4 is of center-open type, and the initial state (neutral state) of which is shown in FIG. 4.

Figure 5:
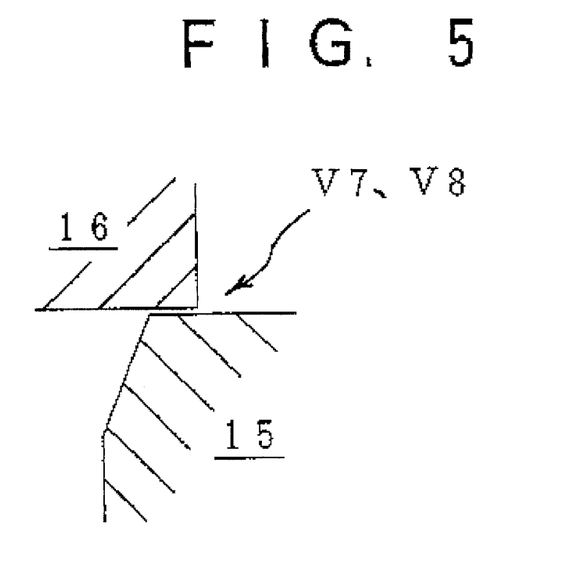
FIG. 5 is an enlarged view of the portion B in FIG. 3.

The second control portion 18 has four fluid paths which are connected to the pump 10, both fluid chambers 12A and 12B of the power cylinder 12 and the reservoir 11, and four variable orifices V5, V6, V7 and V8 are disposed in the middle of the fluid paths, respectively. Each of the variable orifices V5 and V6 communicating with the pump 10 is of center-open type, the same as the variable orifices V1-V4 of the first control portion 17. Each of the variable orifices V7 and V8 communicating with the reservoir 11 is of center-closed type, the initial state of which is shown in FIG. 5.

Figure 6:
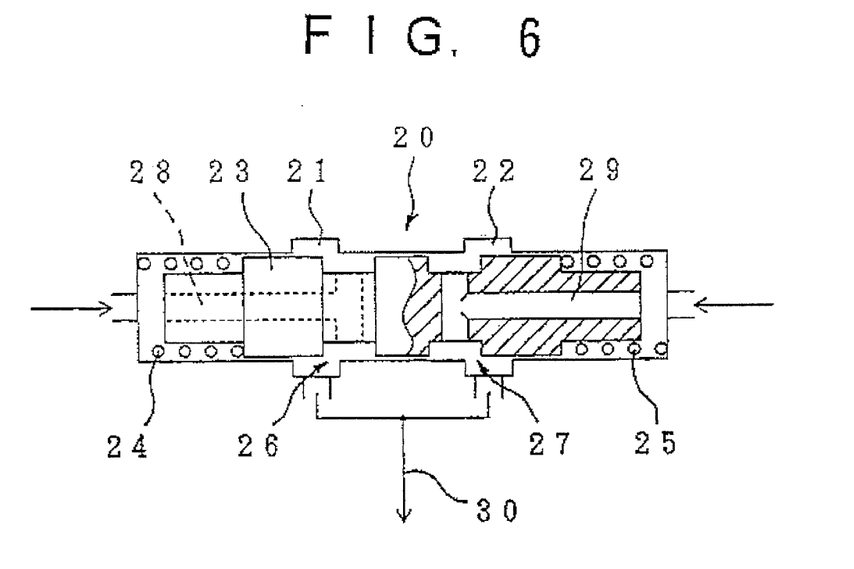
FIG. 6 is a detail view of a switching valve shown in FIGS. 2 and 3.

The both fluid chambers 12A and 12B is communicated to a switching valve 20 which actuates in response to the difference pressure therebetween. The construction of the switching valve 20 is shown in FIG. 6 in detail. A spool 23 is slidably received in a housing and is normally maintained at the central position of the housing due to springs 24 and 25 interposed between the both ends of the spool 23 and the housing. The spool 23 has a pair of communication passages 28 and 29 communicating with each of the fluid chambers 12A and 12B. The housing is provided with two annular grooves 21 and 22 with a space in the longitudinal direction, which grooves are coupled to each other to communicate with the reservoir 11 through a drain passage 30. A first orifice 26 and a second orifice 27 are respectively formed between the spool 23 and the annular groove 21, and between the spool 23 and the annular groove 22. In such state that the two orifices 26 and 27 are equal in the opening areas, the pressure in the fluid chambers 12A and 12B are equal and the spool 23 is located at the central position of the housing. The fluid chamber 12A is communicated to the drain passage 30 through the communication passage 28 and the first orifice 26, while the fluid chambers 12B is communicated to the drain passage 30 through the communication passage 29 and the second orifice 27. When the spool 23 is moved in either direction in response to the differential pressure between the fluid chambers 12A and 12B, the first orifice 26 communicating with the fluid chamber 12A or the second orifice 27 communicating with the fluid chamber 12B under the high pressure is closed by the spool 23, whereby the fluid chamber 12A or 12B under the high pressure is shut off from the reservoir 11.

Figure 7:
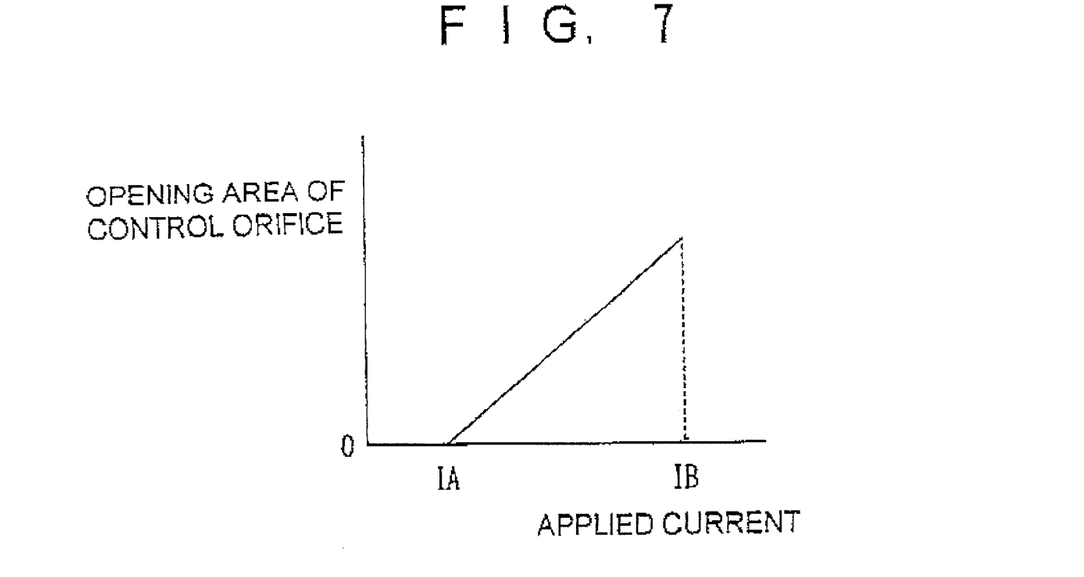
FIG. 7 is a characteristic diagram graphically showing the relationship between a current applied to a solenoid valve and an opening area of its control orifice.

In the middle of the drain passage 30 for connecting the two orifices 26 and 27 with the reservoir 11 is disposed a solenoid valve 32 having a control orifice 31 whose opening area is changed in accordance with a vehicle speed. A vehicle speed sensor 33 detects a vehicle speed and output a corresponding speed signal to an electronic controller 34. A current applied to the solenoid valve 32 is controlled by the electronic controller 34 in accordance with the vehicle speed within a range between values IA and IB. Referring to FIG. 7, the applied current is controlled to gradually decrease as the vehicle speed becomes high, whereby the opening area of the control orifice 31 is decreased. At a high vehicle speed, the applied current reaches to value IA to close the control orifice 31 of the solenoid valve 32.

The operation of the power steering apparatus as constructed above will now be described.

The pressurized fluid discharged from the pump 10 at the constant flow rate is supplied to the first and second control portions 17 and 18. At a low vehicle speed or stoppage of the vehicle, the control orifice 31 of the solenoid valve 32 is fully opened. When the steering wheel 13 is not rotated in such state, i.e., the rotary control valve 14 is at the neutral position, the center-closed variable orifices V7 and V8 of the second control portion 18 are closed and the center-open variable orifices V5 and V6 of the second control portion 18 are opened. Therefore, the both fluid chambers 12A and 12B of the power cylinder 12 are in communication with each other through the center-open variable orifices V5 and V6, and the pressures therein are maintained to be substantially same. The pressurized fluid discharged from the pump 10 is drained to the reservoir 11 through the center-open variable orifices V5 and V6, the two orifices 26 and 27 of the switching valve 20, and the control orifice 31 of the solenoid valve 32. On the other hand, the pressurized fluid supplied to the first control portion 17 is drained to the reservoir 11 through the center-open variable orifices V1-V4.

When the valve shaft 15 is rotated relative to the valve body 16 upon the rotation of the steering wheel 13 at a low vehicle speed or stoppage of the vehicle, for example, in the leftward direction in FIG. 3, the opening area of the center-open variable orifice V5 of the second control portion 18 increases while the opening area of the other center-open variable orifice V6 decreases, whereby the flow passing through the center-open variable orifice V5 becomes larger than that passing through the other center-open variable orifice V6. Accordingly, the pressure acting on the left end of the spool 23 of the switching valve 20 via the center-open variable orifice V5 becomes higher than that acting on the right end of the spool 23 via the other center-open variable orifice V6. The spool 23 is then moved in the rightward direction to close the first orifice 26. At this time, the second orifice 27 is fully opened.

Figure 8:
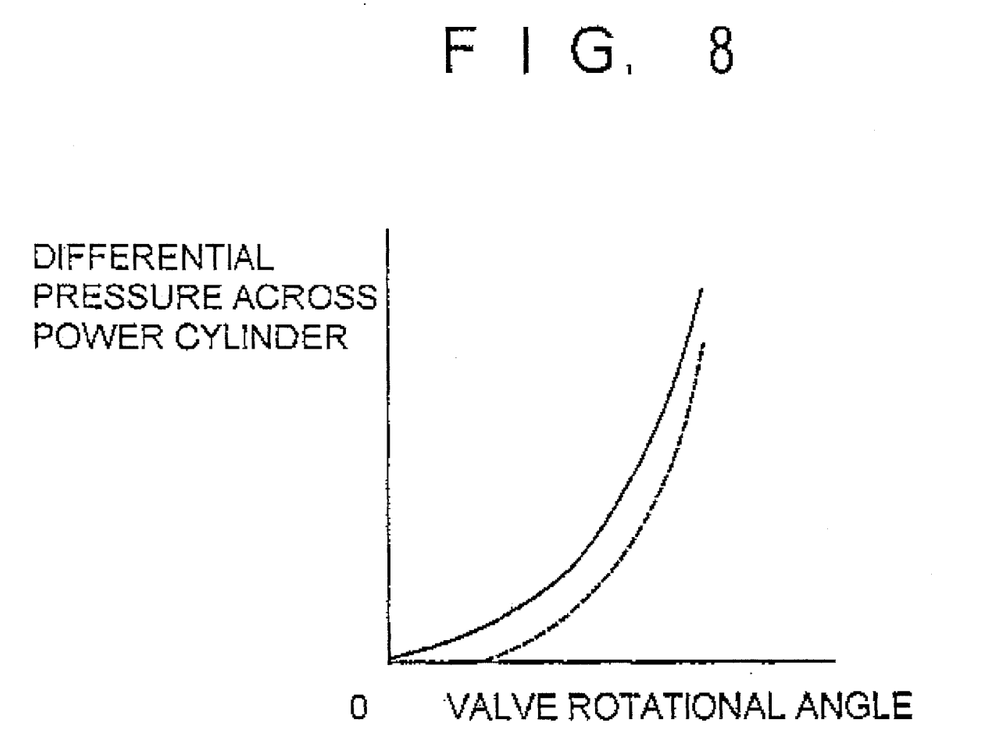
FIG. 8 is a characteristic diagram graphically showing each relationship between the relative rotational angle of the control valve and the differential pressure across a power cylinder at high and low vehicle speeds.

Under this condition, the pressure in the right fluid chamber 12B of the power cylinder 12 is maintained to be low since the right fluid chamber 12B is communicated to the reservoir 11 through the control orifice 31 of the solenoid valve 32, while the left fluid chamber 12A is shut off from the reservoir 11 because the first orifice 26 of the switching valve 20 is closed. This causes the differential pressure between the both fluid chambers 12A and 12B, whereby the steering operation of the steering wheel 13 can be assisted. As illustrated by the solid curved line in FIG. 8, the differential pressure between the both fluid chambers 12A and 12B increases in accordance with the increase in the relative rotational angle of the rotary control valve 14. Therefore, the sufficiently power assisted steering operation can be always carried out when the steering wheel 13 is rotated at a low speed or stoppage of the vehicle.

On the other hand, at a high vehicle speed, the control orifice 31 of the solenoid valve 32 is completely closed to shut off the two orifices 26 and 27 of the switching valve 20 from the reservoir 11. Although the opening areas of the center-open variable orifices V5 and V6 of the second control portion 18 are changed upon the rotation of the steering wheel 13, the differential pressure between the both fluid chambers 12A and 12B of the power cylinder 12 is maintained to be zero within a neutral zone that the relative rotational angle of the rotary control valve 14 is small, as illustrated by the dotted curved line in FIG. 8, because the both center-closed variable orifices V7 and V8 of the second control portion 18 remain in the closed state within the neutral zone. Namely, within the neutral zone, the steering feeling is the same as that in a manual steering apparatus, and the total rigidity against rotation of the steering wheel 13 around the neutral position, i.e., the resistance to turn the same can be increased. The pressurized fluid discharged from the pump 10 is drained to the reservoir 11 only through the first control portion 17.

At this high vehicle speed, when the center-closed variable orifice V8 begins to open upon further rotation of the steering wheel 13, for example, in the leftward direction, the pressurized fluid in the fluid chambers 12B is drained to the reservoir 11 through the center-closed variable orifice V8. This causes the pressure in the fluid chamber 12B to decrease, resulting in the generation of the differential pressure between the both fluid chambers 12A and 12B. The spool 23 of the switching valve 20 is hence moved in the rightward direction so as to prevent both fluid chambers 12A and 12B from being in communication with each other. The hydraulic characteristic of the power steering apparatus is then determined in only dependence upon the variable orifices V1–V8 of the rotary control valve 14.

Incidentally, when the steering wheel 13 is returned, the position of the valve shaft 15 of the rotary control valve 14 relative to the valve body 16 comes back to the neutral position. In this state, the pressurized fluid in the fluid chamber 12A is led to the fluid chamber 12B through the center-open variable orifices V5 and V6. This advantageously allows the steering wheel 13 to return smoothly.

Since the operation of the rotary control valve 14 when the valve shaft 15 is relatively rotated in the rightward direction as viewed in FIG. 3 is easily understood from the foregoing description, the detail description thereof is omitted for the sake of brevity.

As described above, in the power steering apparatus according to the present invention, the differential pressure across the power cylinder 12 is generated in accordance with the relative rotational angle of the rotary control valve 14 when the steering wheel 13 is rotated at a low vehicle speed or stoppage of the vehicle. Therefore, the steering operation can be easily carried out even around the neutral position of the steering wheel 13.

At a high vehicle speed, the differential pressure across the power cylinder 12 is maintained to be substantially zero when the steering wheel 13 is around the neutral position. Therefore, the driver can definitely feel the neutral position of the steering wheel 13, because the total rigidity of the steering wheel 13, i.e., the resistance to turn the same is enhanced around the neutral position. When the steering wheel 13 is further turned in either direction from the neutral position, the differential pressure across the power cylinder 12 is generated in dependence upon the control characteristic of the rotary control valve 14.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:

a fluid source for supplying pressurized fluid;

a power cylinder having a pair of fluid chambers and operable to generate assisting power;

a control valve comprising a first control portion for controlling the flow of pressurized fluid from said fluid source to a reservoir wherein each of at least one path connecting said fluid source and reservoir is formed with a variable orifice of center-open type, and a second control portion for controlling the flow of pressurized fluid from said fluid source to said power cylinder wherein each of two supply paths communicating said fluid source respectively with said fluid chambers of said power cylinder is formed with a variable orifice of center-open type and each of two drain paths communicating said fluid chambers of said power cylinder respectively with said reservoir is formed with a variable orifice of center-closed type; and a drain control mechanism responsive to differential pressure between said fluid chambers of said power cylinder to control the communication of one fluid chamber under higher pressure with said reservoir, and responsive to a vehicle speed to control the communication of both fluid chambers with said reservoir.

2. A power steering apparatus according to claim 1, wherein said fluid chambers of said power cylinder are communicated with said reservoir through said drain control mechanism, and wherein said drain control mechanism comprises:

switching means communicating with said fluid chambers of said power cylinder to be actuate in accordance with the differential pressure between said fluid chambers; and valve means having a control orifice whose opening area is changed in accordance with the vehicle speed.

3. A power steering apparatus according to claim 2, wherein said switching means prevents said fluid chamber under higher pressure from being communicated with said valve means when the differential pressure is generated between said fluid chambers.

4. A power steering apparatus according to claim 3, wherein said valve means comprises a solenoid valve controlled by a vehicle speed signal, and wherein said control orifice of said valve means is opened at a low vehicle speed and closed at a high vehicle speed.

5. A power steering apparatus according to claim 3, wherein said switching means has two variable orifices which are respectively formed on two fluid passages connecting said fluid chambers of said power cylinder and said valve means, and wherein one variable orifice which is formed on the fluid passage connecting said fluid chamber under higher pressure is closed in response to the differential pressure between said fluid chambers of said power cylinder.

6. A power steering apparatus according to claim 1, wherein said first control portion forms two supply paths communicating with said fluid source and two drain paths communicating with said reservoir, and each of said paths is formed with a variable orifice of center-open type.

* * * * *